(12) United States Patent
Tamada

(10) Patent No.: US 7,618,082 B2
(45) Date of Patent: Nov. 17, 2009

(54) VEHICLE SHOCK ABSORBER

(75) Inventor: Teruo Tamada, Yokohama (JP)

(73) Assignee: Kyoraku Co., Ltd., Tokyo (JP)

( * ) Notice: Subject to any disclaimer, the term of this patent is extended or adjusted under 35 U.S.C. 154(b) by 0 days.

(21) Appl. No.: 10/596,089

(22) PCT Filed: Nov. 8, 2004

(86) PCT No.: PCT/JP2004/016892

§ 371 (c)(1),
(2), (4) Date: Jan. 25, 2007

(87) PCT Pub. No.: WO2005/051724

PCT Pub. Date: Jun. 9, 2005

(65) Prior Publication Data

US 2007/0210615 A1    Sep. 13, 2007

(30) Foreign Application Priority Data

Nov. 28, 2003   (JP) .............................. 2003-399874

(51) Int. Cl.
*B60R 19/18*    (2006.01)
*B60R 19/03*    (2006.01)
(52) U.S. Cl. ................. 296/146.6; 296/187.05
(58) Field of Classification Search ............. 296/146.6, 296/187.03, 187.05, 187.09, 187.12; 293/107, 293/120, 121, 132, 133, 134, 136; 206/521, 206/588, 590, 593
See application file for complete search history.

(56) References Cited

U.S. PATENT DOCUMENTS 3,010,540 A * 11/1961 Dahlen .................. 188/377
3,884,455 A *  5/1975 Weller et al. ............. 267/140

(Continued)

FOREIGN PATENT DOCUMENTS

JP          07016867         1/1995

(Continued)

OTHER PUBLICATIONS

PCT Search Report dated Dec. 8, 2004 of Patent Application No. PCT/JP2004/016892 filed Nov. 8, 2004.

*Primary Examiner*—Glenn Dayoan
*Assistant Examiner*—Paul A Chenevert
(74) *Attorney, Agent, or Firm*—Vern Maine & Associates

(57) ABSTRACT

A vehicle shock absorber by which a uniform shock absorbing property can be obtained in all positions on a shock receiving surface and, particularly, a further uniform shock absorbing property can be obtained if the distance from the lower end of a recessed groove in a first wall to a second wall is made equal to the distance from the lower end of the recessed groove in the first wall to the lower end of a recessed groove in the second wall. A vehicle shock absorber (1) is installed inside a vehicle component part so as to absorb shocks from interior or exterior. The vehicle shock absorber (1) is formed hollow by blow-molding thermoplastic plastic. A first wall (2) and a second wall (3)are spaced from and opposed to each other. A shock receiving surface (4) connects the first and second walls (2, 3). The first and second walls (2, 3) are formed with pluralities of recessed grooves (5, 6) at substantially equally spaced intervals. The recessed grooves (5, 6) are disposed substantially normal to the shock receiving surface (4).

6 Claims, 9 Drawing Sheets

U.S. PATENT DOCUMENTS

| | | | |
|---|---|---|---|
| 3,995,901 A * | 12/1976 | Filbert et al. | 293/136 |
| 4,934,751 A * | 6/1990 | Shimoda | 296/203.03 |
| 4,969,680 A * | 11/1990 | Shimoda | 296/146.6 |
| 5,033,593 A * | 7/1991 | Kazuhito | 188/377 |
| 5,382,051 A * | 1/1995 | Glance | 280/751 |
| 5,884,962 A * | 3/1999 | Mattingly et al. | 296/187.05 |
| 6,036,227 A * | 3/2000 | Lin et al. | 280/751 |
| 6,312,028 B1 * | 11/2001 | Wilkosz | 293/133 |
| 6,406,079 B2 * | 6/2002 | Tamada et al. | 293/120 |
| 6,443,513 B1 * | 9/2002 | Glance | 293/133 |
| 6,672,635 B2 * | 1/2004 | Weissenborn et al. | 293/120 |
| 6,698,819 B1 * | 3/2004 | Mozer et al. | 296/187.03 |
| 7,111,713 B2 * | 9/2006 | Tamada et al. | 188/371 |
| 7,143,876 B2 * | 12/2006 | Tamada et al. | 188/371 |
| 7,144,055 B2 * | 12/2006 | Kimura et al. | 293/133 |
| 7,178,647 B2 * | 2/2007 | Tamada et al. | 188/371 |
| 7,306,080 B2 * | 12/2007 | Tamada et al. | 188/377 |
| 7,306,081 B2 * | 12/2007 | Tamada et al. | 188/377 |
| 7,370,893 B2 * | 5/2008 | Tamada et al. | 293/120 |
| 2007/0187961 A1 * | 8/2007 | Audi et al. | 293/134 |
| 2008/0036242 A1 * | 2/2008 | Glance et al. | 296/187.09 |

FOREIGN PATENT DOCUMENTS

| | | |
|---|---|---|
| JP | 08108812 | 4/1996 |
| JP | 08207579 | 8/1996 |
| JP | 2002029339 | 1/2002 |
| JP | 2002029340 | 1/2002 |
| JP | 2002029341 | 1/2002 |

* cited by examiner

VEHICLE SHOCK ABSORBER

RELATED APPLICATION

This application is a 35 U.S.C. 371 national phase application of PCT Application Ser. No. PCT/JP2004/016892, filed 8 Nov. 2004,which claims priority to Japanese Application No. 2003-399874, filed 28 Nov. 2003. Each of these application is herein incorporated in its entirety by reference.

1. Technical Field

The present invention relates to a vehicle shock absorber, provided inside a vehicle structural member such as a door, a body side panel or a bumper facia, for absorbing the shock from the inside such as the collision of a passenger against the inner wall of the vehicle structural member or the shock from the outside such as the collision or contact with another vehicle or other objects.

2. Background Art

As the vehicle shock absorber of this kind, the following absorbers are known. That is, vehicle bumpers each having a blow-molded bumper core (vehicle shock absorber) which are disposed on left and right portions inside of a bumper facia are described in Japanese Patent Application Laid-Open No. 2002-29339, a bumper core (vehicle shock absorber) made of blow-molding in which a portion of a sidewall is recessed toward a hollow portion to form a rib is described in Japanese Patent Application Laid-Open No. 2002-29341, a shock absorbing material made of foam product in which ribs are disposed at uniform distances from one another as shock absorbing portions and the shock absorbing portions are formed in a shock surface is described in Japanese Patent Applications Laid-Open Nos. 7-16867 and 8-108812, a bumper beam made of blow-molding in which recesses are formed in a shock receiving surface in zigzag manner is described in Japanese Patent Application Laid-Open No. 8-108812, and a shock energy absorber made of elastic material formed with lattice is described in Japanese Patent Application Laid-Open No. 8-207579.

In the conventional vehicle shock absorbers described in the above patent documents, when the shock receiving surface is small, it is difficult to form recessed ribs in the shock receiving surface. In addition, when the shock absorber is long in the shock direction, it is difficult to form the recessed rib in the shock receiving surface, and thus a desired shock absorbing property can not be obtained.

That is, the shape of the vehicle shock absorber is determined by a vehicle structural member, inside which the absorber is provided. Thus, not only when the shock receiving surface of the vehicle shock absorber is small and the shock absorber is long in the shock direction, but also when an area of a first or second wall is wider than an area of the shock receiving surface, it is difficult to provide a substantially vertical recessed rib in the shock receiving surface by blow-molding. Even if the recessed rib could be formed, position where the recessed ribs are formed is limited, many recessed ribs can not be formed, or the recessed ribs are expanded at the time of forming and the ribs become thin, so that the desired shock absorbing property can not be obtained in some cases.

SUMMARY OF THE INVENTION

Hence, it is an object of the present invention to provide a vehicle shock absorber in which: a first wall and a second wall are opposed to each other at a distance therebetween; a shock receiving surface connects the first wall and the second wall; a plurality of recessed grooves are formed in the first wall and the second wall substantially at uniform distances from one another; the recessed grooves are formed by walls which are substantially perpendicular to the shock receiving surface, and formed from an end of the shock receiving surface of the first wall or the second wall to the other end; a uniform shock absorbing property can be thus obtained in all of positions of the shock receiving surface; and if a distance from a lower end of a recessed groove in the first wall to the second wall is made equal to a distance from the lower end of the recessed groove in the first wall to a lower end of a recessed groove in the second wall, a further uniform shock absorbing property can be obtained.

According to the vehicle shock absorber of one embodiment of the present invention, a uniform shock absorbing property can be obtained in all of positions of the shock receiving surface, and especially if a distance from a lower end of a recessed groove in a first wall to a second wall is made equal to a distance from the lower end of the recessed groove in the first wall to a lower end of the recessed groove in the second wall, a further uniform shock absorbing property can be obtained.

To achieve the above object, a first aspect of the present invention provides a vehicle shock absorber installed inside a vehicle structural member so as to absorb shocks from interior or exterior, wherein the vehicle shock absorber is formed to be hollow by blow-molding thermoplastic plastic, a first wall and a second wall are provided to be spaced from and opposed to each other, a shock receiving surface connects the first and second walls, the first and second walls are formed with a plurality of recessed grooves at substantially equal spaced intervals, the recessed grooves are formed by walls which are substantially perpendicular to the shock receiving surface, and the recessed grooves are formed from an end of the shock receiving surface of the first wall or the second wall to the other end.

According to a second aspect of the invention, in the vehicle shock absorber of the first aspect, the recessed groove in the second wall is provided at a position opposed to a wall surface between two adjacent recessed grooves formed in the first wall so that the recessed grooves formed in the first wall and recessed grooves formed in the second wall are disposed alternately.

According to a third aspect of the invention, in the vehicle shock absorber of the first or second aspect, the shock receiving surface is formed with semi-arc notches formed by the recessed grooves formed in the first wall and the second wall, and a parting line is formed between the notch formed by the recessed groove formed in the first wall and the notch formed by the recessed groove formed in the second wall.

According to a fourth aspect of the invention, in the vehicle shock absorber of the first, second, or third aspect, the vehicle shock absorber is interposed between a bumper beam and a bumper facia, and the shock receiving surface is disposed on the side of the bumper facia.

DETAILED DESCRIPTION

The present invention will be explained in detail with reference to the accompanying drawings.

Figure 1:
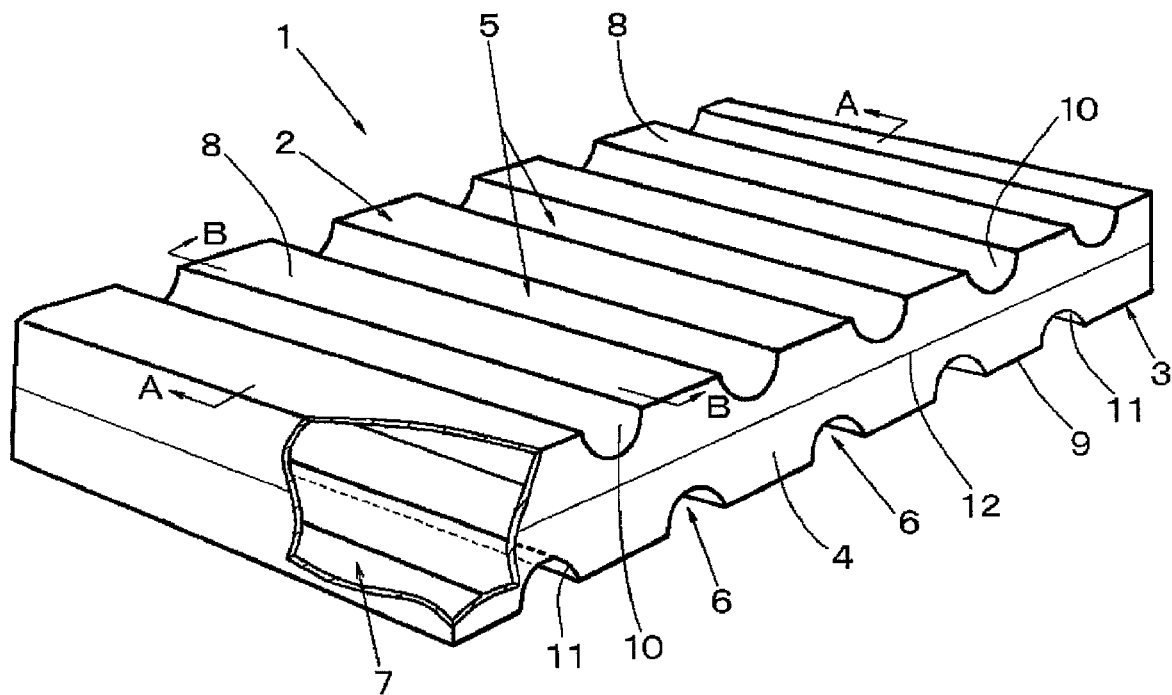
FIG. 1 is a partially cut-away perspective view of a vehicle shock absorber according to an embodiment of the present invention.
Figure 2:
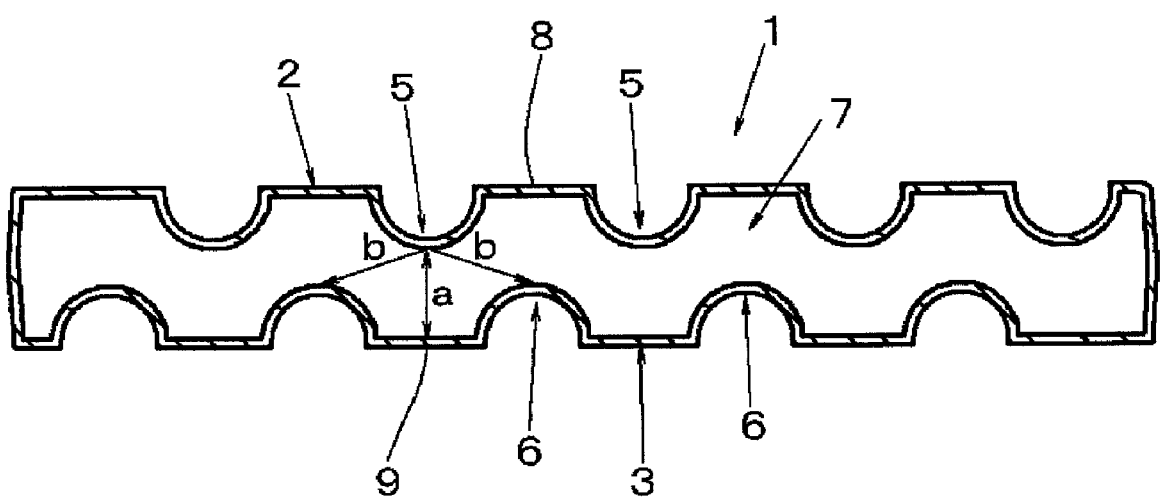
FIG. 2 is a sectional view taken along the line A-A in FIG. 1.
Figure 3:
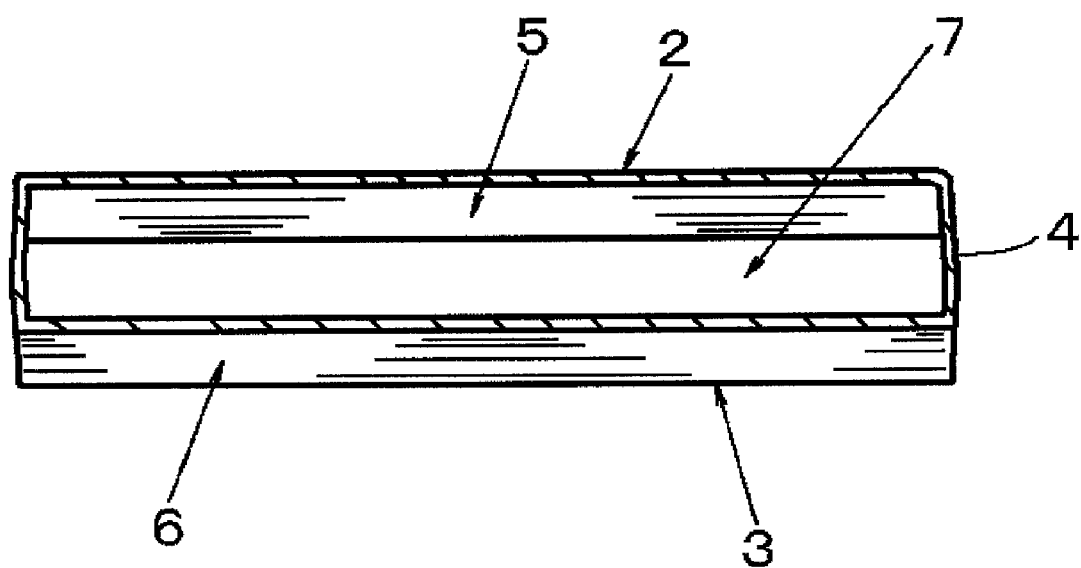
FIG. 3 is a sectional view taken along the line B-B in FIG. 1.

In FIGS. 1 to 3, a reference symbol 1 represents a vehicle shock absorber. The vehicle shock absorber 1 is formed to be hollow by blow-molding thermoplastic plastic, and a first wall 2 and a second wall 3 are opposed to each other at a distance from each other. A peripheral wall connecting one ends of the first wall 2 and the second wall 3 functions as a shock receiving surface 4. The first wall 2 and the second wall 3 are formed with a plurality of recessed grooves 5 and 6 arranged at substantially equal distances from each other. A reference symbol 7 represents a hollow portion.

In the shock absorber 1, an area of the shock receiving surface 4 is smaller than an area of the first wall 2 or the second wall 3. The shortest distance from a contact point between the shock receiving surface 4 and the first wall 2 to a contact point between the shock receiving surface 4 and the second wall 3 is formed to be shorter than the shortest distance from an end of the first wall 2 or the second wall 3 on the side of the shock receiving surface 4 to the other end thereof.

The recessed grooves 5 and 6 formed in the first wall 2 and the second wall 3 are arranged alternately with respect to each other. The recessed grooves 6 formed in the second wall 3 are provided at positions opposed to wall surfaces 8 between adjacent two recessed grooves 5 and 5 formed in the first wall 2. The recessed grooves 5 formed in the first wall 2 are formed at positions opposed to wall surfaces 9 between adjacent two recessed grooves 6 and 6 in the second wall 3. The recessed grooves 5 and 6 are formed into semi-arc shapes. The recessed grooves 5 and 6 are formed from one end of the first wall 2 or the second wall 3 on the side of the shock receiving surface 4 to the other end thereof. Semi-arc notches 10 and 11 formed by the recessed grooves 5 and 6 formed in the first wall 2 and the second wall 3 are formed in the shock receiving surface 4. A parting line 12 is formed between the notches 10 formed by the recessed grooves 5 formed in the first wall 2 and the notches 11 formed by the recessed grooves 6 formed in the second wall 3.

The plurality of recessed grooves 5 and 6 are formed in the first wall 2 and the second wall 3 of the vehicle shock absorber 1 at equal distances from one another and are formed by walls which are substantially perpendicular to the shock receiving surface 4. The recessed grooves 5 and 6 extend from the one end of the first wall 2 or the second wall 3 on the side of the shock receiving surface 4 to the other end thereof. Since the recessed grooves 5 formed in the first wall 2 and the recessed grooves 6 formed in the second wall 3 are arranged alternately with respect to each other, a uniform shock absorbing property can be obtained in all of positions of the shock receiving surface 4. If a distance a from a lower end of the recessed groove 5 in the first wall 2 to the second wall 3 and a distance b from the lower end of the recessed groove 5 in the first wall 2 to a lower end of the recessed groove 6 in the second wall 3 are equal, a more uniform shock absorbing property can be obtained.

In on embodiment, it is preferable that the recessed grooves 5 and 6 are of semi-arc shape, but the grooves can be formed longer in accordance with a shape of the vehicle shock absorber 1. In addition, although the recessed grooves 5 and 6 are formed by walls which are substantially perpendicular to the shock receiving surface 4, a stable shock absorbing property can be obtained by inclining lower ends of the recessed grooves 5 and 6 with respect to the shock receiving surface 4. In one embodiment an inclination angle is 3 to 10°.

The vehicle shock absorber 1 is made of resin which can be blow-molded. Resin may be thermoplastic plastic having bending elastic modulus in the range of 800 to 2500 MPa. Polypropylene, polyethylene, polymer alloy having polypropylene or polyethylene as basic material, or polyolefin-based resin such as blended material is preferable.

Figure 4:
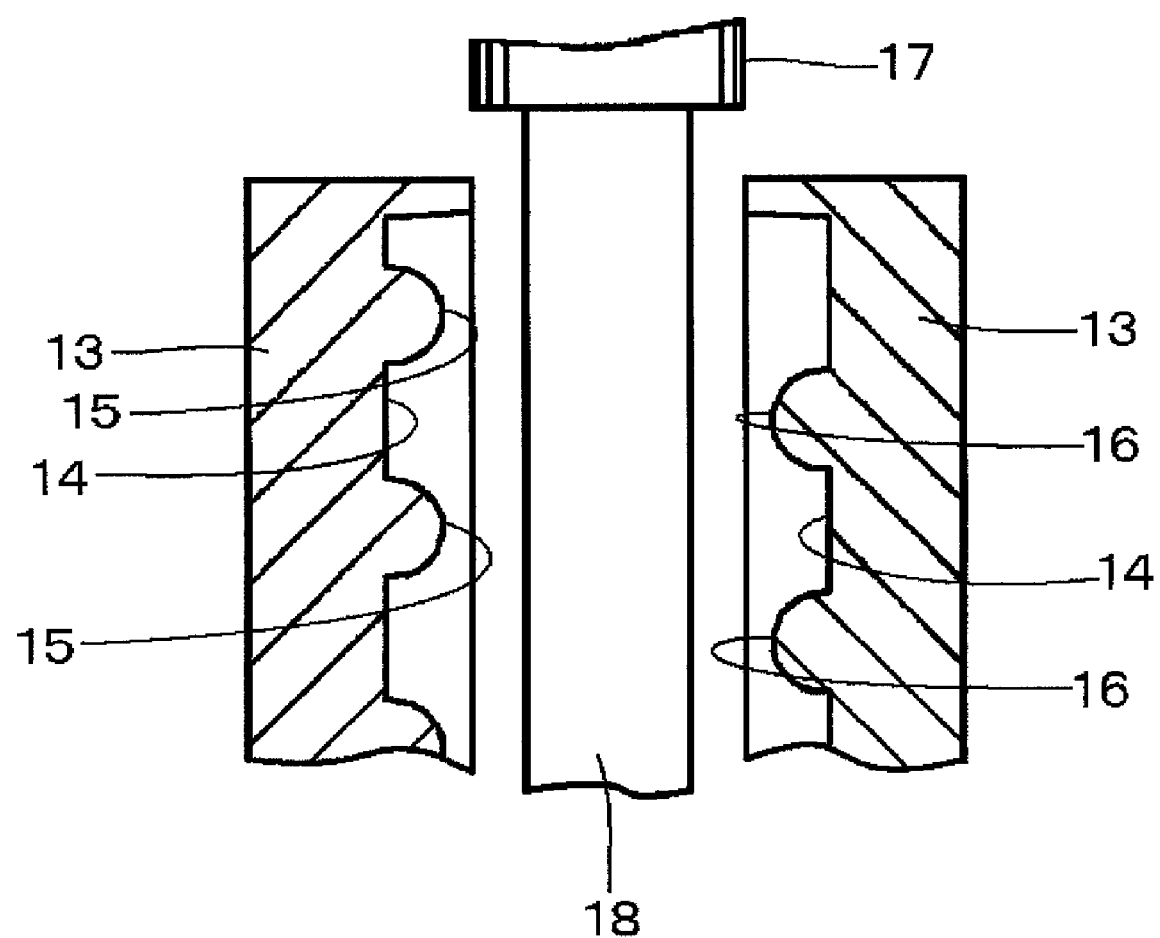
FIG. 4 is a sectional view showing a blow-molding of the shock absorber of the invention.
Figure 5:
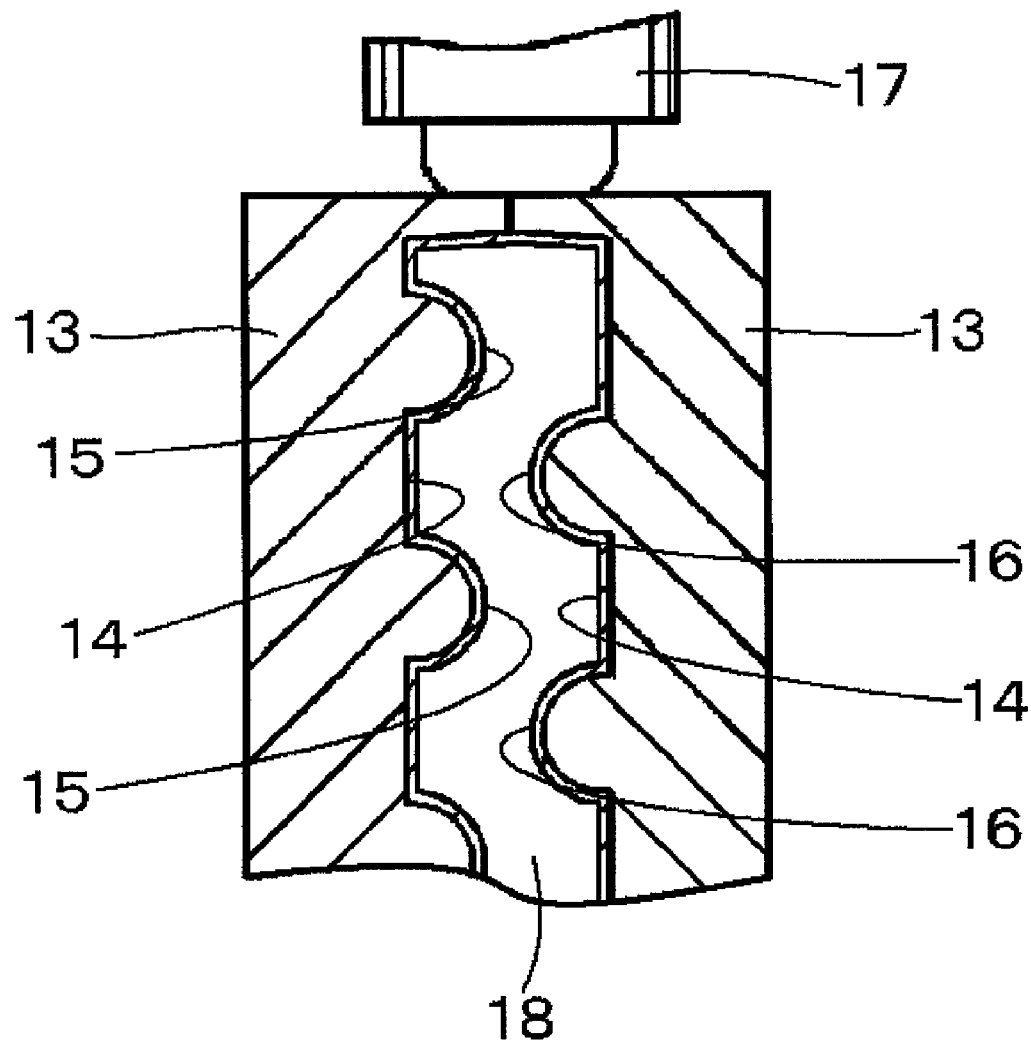
FIG. 5 is a sectional view of the closed mold.

As shown in FIGS. 4 and 5, the vehicle shock absorber 1 is in one embodiment blow-molded. That is, reference symbols 13 represent a pair of split type molds, reference symbols 14 represent cavities, a reference symbol 15 represents a recessed groove forming portion, a reference symbol 17 represents an extrusion head, and a reference symbol 18 represents a parison. As shown in FIG. 4, the parison 18 is disposed between the pair of split type molds 13 and 13, and the molds are closed and blow-molding is carried out as shown in FIG. 5.

In the above-described blow-molding, the ends of the recessed grooves 5 and 6 reach the shock receiving surface 4, the notches 10 and 11 are formed in the shock receiving surface 4, and the parting line 12 is formed between the notches 10 formed by the recessed grooves 5 formed in the first wall 2 and the notches 11 formed by the recessed grooves 6 formed in the second wall 3. Therefore, the vehicle shock absorber 1 can be formed such that the entire thickness thereof is substantially uniform, and an excellent shock absorbing property can be obtained.

Figure 6:
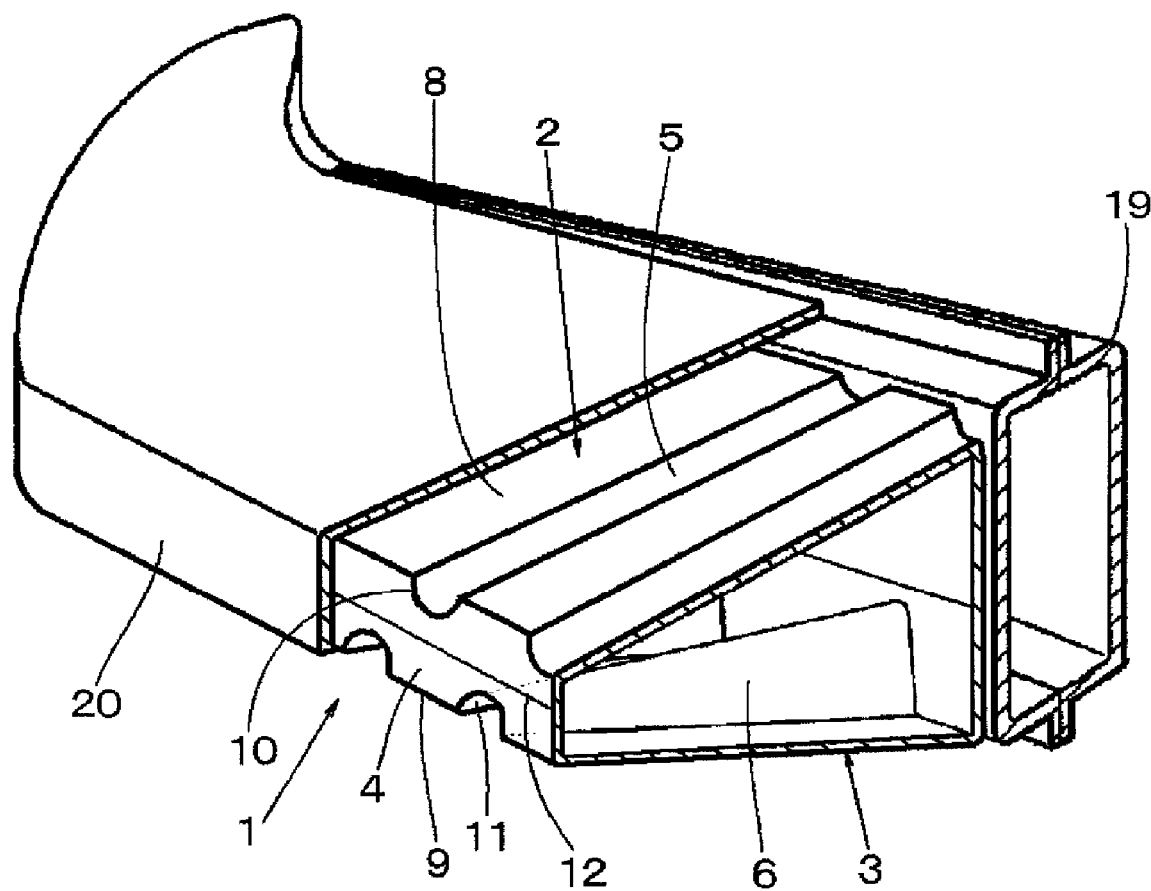
FIG. 6 is a partially cut-away perspective view of a state in which the vehicle shock absorber of the invention is provided in a bumper.
Figure 7:
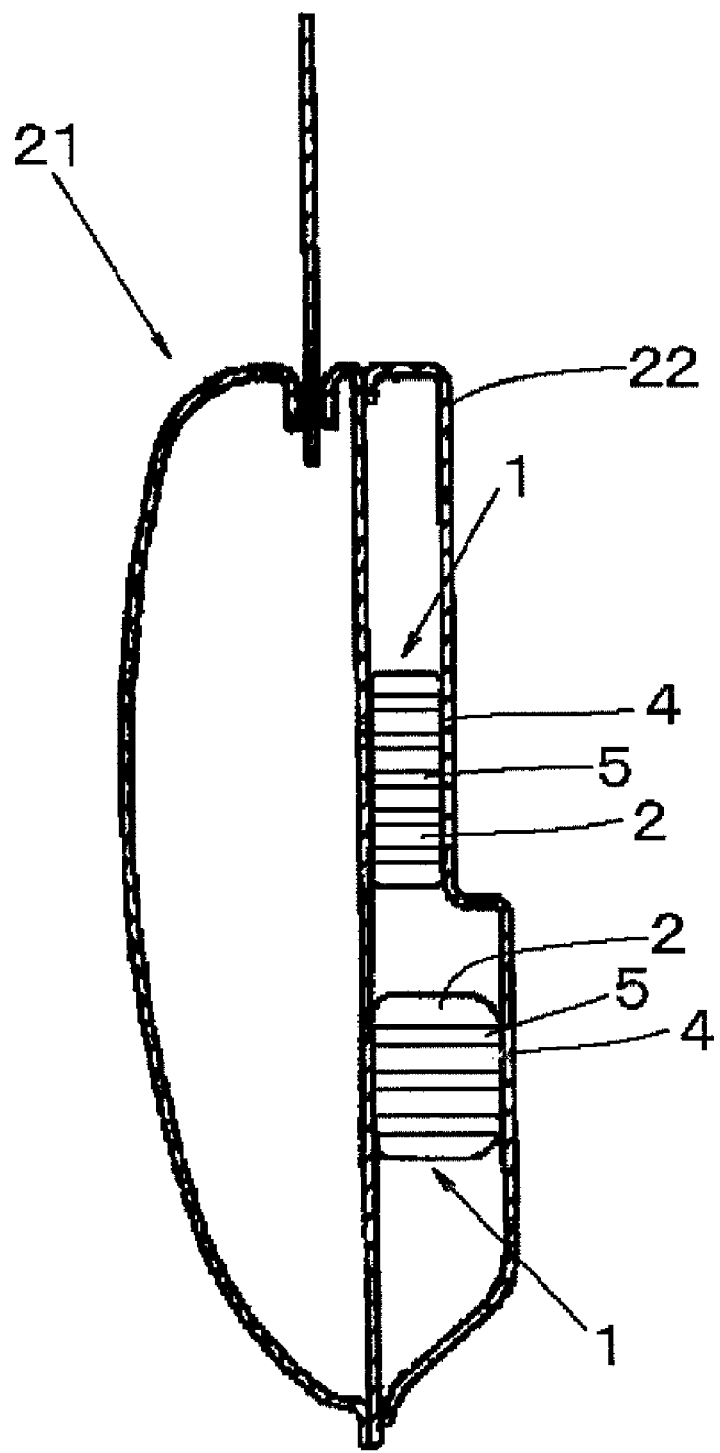
FIG. 7 is a sectional view showing a state in which the vehicle shock absorber of the invention is provided in a door panel of a vehicle.
Figure 8:
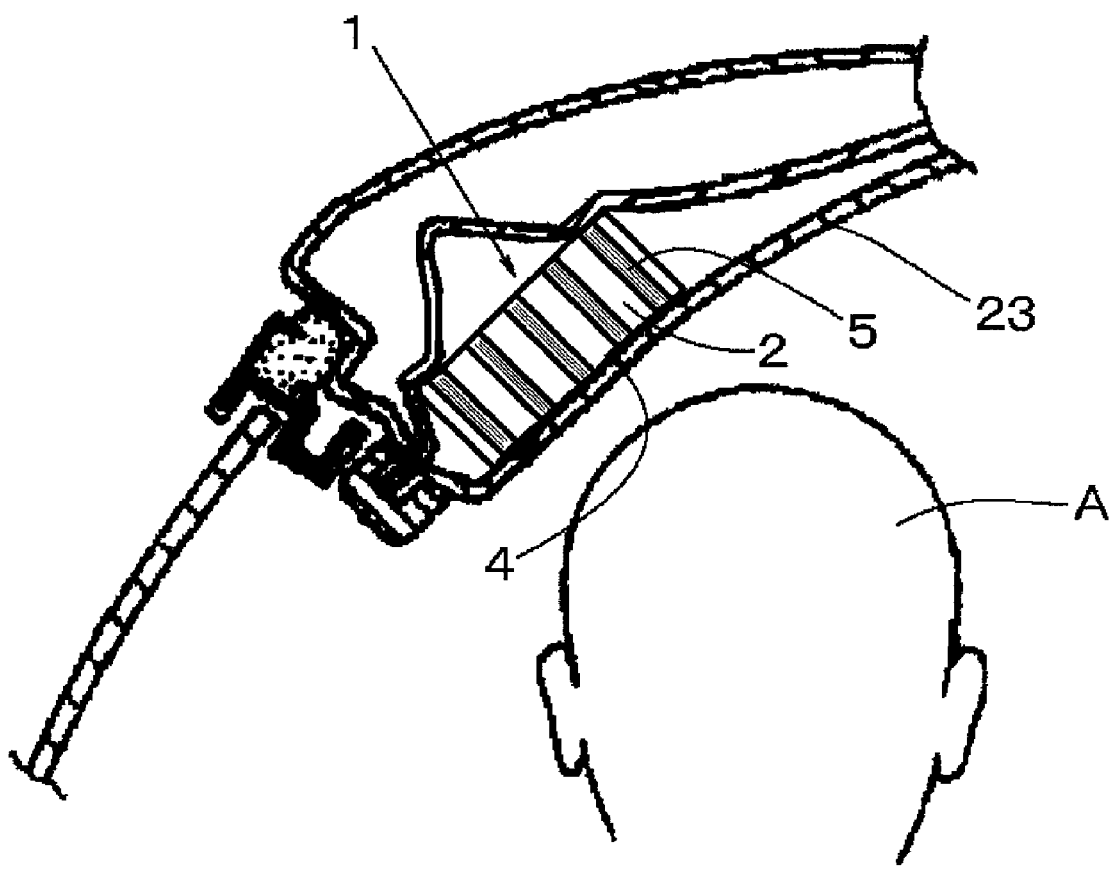
FIG. 8 is a sectional view showing a state in which the vehicle shock absorber of the invention is provided in a rear pillar of the vehicle.

FIGS. 6 to 8 show an example of use of the vehicle shock absorber 1 according to the invention. That is, in FIG. 6, the vehicle shock absorber 1 is interposed between a bumper beam 19 and a bumper facia 20. The vehicle shock absorber 1 is disposed such that the shock receiving surface 4 butts against the bumper facia 20.

FIG. 7 shows a door trim 22 of a door 21 provided therein with the vehicle shock absorber 1 of the invention. FIG. 8 shows a rear pillar 23 provided therein with the vehicle shock absorber 1 of the invention. In FIG. 8, A shows a head of a passenger.

Figure 9:
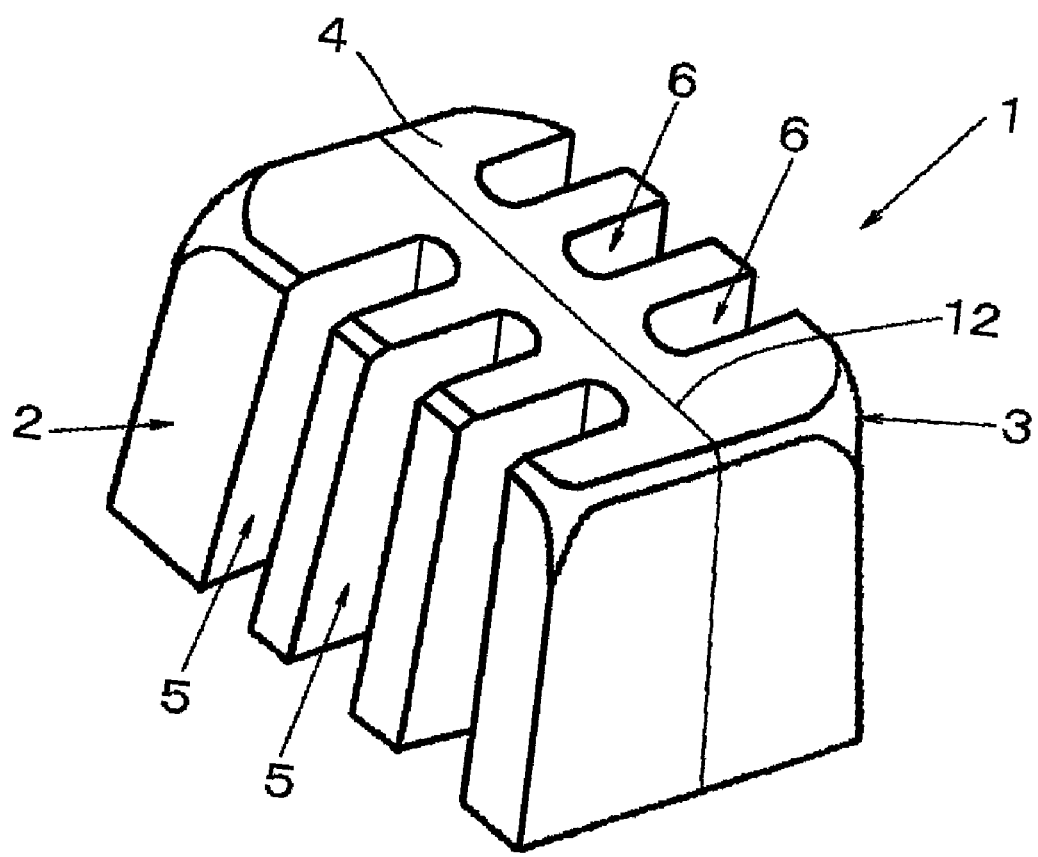
FIG. 9 is a perspective view of a vehicle shock absorber of another embodiment of the invention.

The vehicle shock absorber 1 of the invention can be constituted as shown in FIG. 9. In this embodiment, a distance between the opposed first wall 2 and the second wall 3 is long, and deep long recessed grooves 5 and 6 are formed in the first wall 2 and the second wall 3.

INDUSTRIAL APPLICABILITY

The vehicle shock absorber of the invention is provided in a vehicle structural member such as a door, a body side panel, a roof panel, a pillar and a bumper of an automobile to remarkably enhance the shock absorbing property thereof. The vehicle shock absorber enhances safety of the automobile.

The invention claimed is:

1. A vehicle shock absorber having first and second ends, said shock absorber comprising:
    opposing first and second walls;
    said first wall disposed apart from said second wall;
    a shock receiving surface at said first end connecting said first and second walls;

a plurality of recessed grooves spaced substantially equally disposed in said first and second walls, and substantially perpendicular to said shock receiving surface; and said recessed grooves extending from said shock receiving surface to said second end, such that a plurality of notches are formed in the shock receiving surface wherein a parting line disposed between notches formed by recessed grooves disposed in said first wall and notches formed by recessed grooves disposed in said second wall, and the recessed groove in the second wall is provided at a position opposed to a wall surface between two adjacent recessed grooves formed in the first wall so that the recessed grooves formed in the first wall and recessed grooves formed in the second wall are disposed alternately, and a distance (a) from a lower end of a recessed groove in a first wall to a second wall is made equal to a distance (b) from the lower end of the recessed groove in the first wall to a lower end of the recessed groove in the second wall;

said vehicle shock absorber being hollow and blow molded of thermoplastic.

2. The vehicle shock absorber according to claim 1, wherein a first recessed groove disposed in said first wall is opposed to a section of said second wall disposed between adjacent second and third recessed grooves disposed in said second wall.

3. The vehicle shock absorber according to claim 1 wherein said notches are semi-arc notches.

4. The vehicle shock absorber according to claim 1 wherein said vehicle shock absorber is configured to be interposed between a bumper beam and a bumper facia, such that said shock receiving surface is disposed proximate to said bumper facia.

5. The vehicle shock absorber according to claim 1 wherein said thermoplastic has a bending elastic modulus between 800 and 2500 MPa.

6. The vehicle shock absorber according to claim 1 wherein said thermoplastic is selected from the group of thermoplastic consisting of polypropylene, polyethylene, polyolephin, and alloys thereof.

* * * * *